(12) United States Patent
Truluck

(10) Patent No.: US 6,227,359 B1
(45) Date of Patent: May 8, 2001

(54) PACKAGING OF OIL-COATED CUTTING TOOLS

(76) Inventor: Russell D. Truluck, 4 Meadows Cir., Arden, NC (US) 28704

(*) Notice: Subject to any disclaimer, the term of this patent is extended or adjusted under 35 U.S.C. 154(b) by 0 days.

(21) Appl. No.: 09/523,806

(22) Filed: Mar. 13, 2000

(51) Int. Cl.[7] ................................................. B65D 81/24
(52) U.S. Cl. ........................ 206/207; 206/379; 206/484; 53/412; 53/431; 383/61; 383/204
(58) Field of Search .................................. 206/205, 207, 206/379, 484; 383/61, 204; 53/412, 431

(56) References Cited

U.S. PATENT DOCUMENTS

| 4,268,531 | * | 5/1981 | Whiting, Jr. ............................ 206/484 |
| 4,407,873 | * | 10/1983 | Christensen et al. ................ 206/484 |
| 4,909,386 | * | 3/1990 | Jeffers ................................... 206/379 |

* cited by examiner

Primary Examiner—David T. Fidei
(74) Attorney, Agent, or Firm—Carter & Schnedler, P.A.

(57) ABSTRACT

A method for the packaging of oil-coated cutting tools, and the resultant packaged product. An oil-coated cutting tool is packaged by providing a package blank which includes a pair of panels of heat-sealable and oil-impervious material defining a product-containing area between them. The panels have edges defining a package top, bottom and opposite sides, and are permanently sealed to each other along the side-defining and top-defining edges, with an opening along the bottom-defining edges. The package blank additionally includes a zipper-type recloseable strip in the form of an interlocking bead structure, which effects an openable and recloseable seal between the panels. The interlocking bead structure extends across the panels generally from one of the side-defining edges to the other, and is spaced a distance from the top-defining edge to define a tear zone portion of the panels between the top-defining edge and the interlocking bead structure. The oil-coated cutting tool is inserted through the opening into the product containing-containing area, and the panels are permanently sealed to each other along the bottom-defining edges so as to close the opening.

6 Claims, 4 Drawing Sheets

PACKAGING OF OIL-COATED CUTTING TOOLS

BACKGROUND OF THE INVENTION

This invention relates to the packaging of oil-coated cutting tools, such as drill bits, taps, dies, cutters of various kinds, hobs, end mills, carbide tools and reamers.

Traditionally, drill bits and other cutting tools are packaged for sale in simple cardboard envelopes or pouches, with a latex-sealed flap. A problem with the prior art approach is that, for protection against rust and discoloration, the cutting tools are dipped in oil prior to packaging. Subsequently, the oil bleeds through the cardboard, degrades the glue used to hold the cardboard pouch together, and can soak through adhesive labels on the cardboard pouch, and the labels tend to drop off.

Despite these disadvantages, cutting tools continue to be packaged in cardboard envelopes.

SUMMARY OF THE INVENTION

In an exemplary embodiment, an oil-coated cutting tool is packaged by providing a package blank which includes a pair of panels of heat-sealable and oil-impervious material defining a product-containing area between them. The panels have edges defining a package top, bottom and opposite sides. The panels are permanently sealed to each other along the side-defining and top-defining edges, and there is an opening along the bottom-defining edges. The package blank additionally includes a zipper-type recloseable strip in the form of an interlocking bead structure, which effects an openable and recloseable seal between the panels. The interlocking bead structure extends across the panels generally from one of the side-defining edges to the other, and is spaced a distance from the top-defining edge to define a tear zone portion of the panels between the top-defining edge and the interlocking bead structure. The oil-coated cutting tool is inserted through the opening into the product containing-containing area, and the panels are permanently sealed to each other along the bottom-defining edges so as to close the opening.

BRIEF DESCRIPTION OF THE DRAWINGS

While the novel features of the invention are set forth with particularity in the appended claims, the invention, both as to organization and content, will be better understood and appreciated, from the following detailed description taken in conjunction with the drawing, in which:

DETAILED DESCRIPTION

Figure 1:
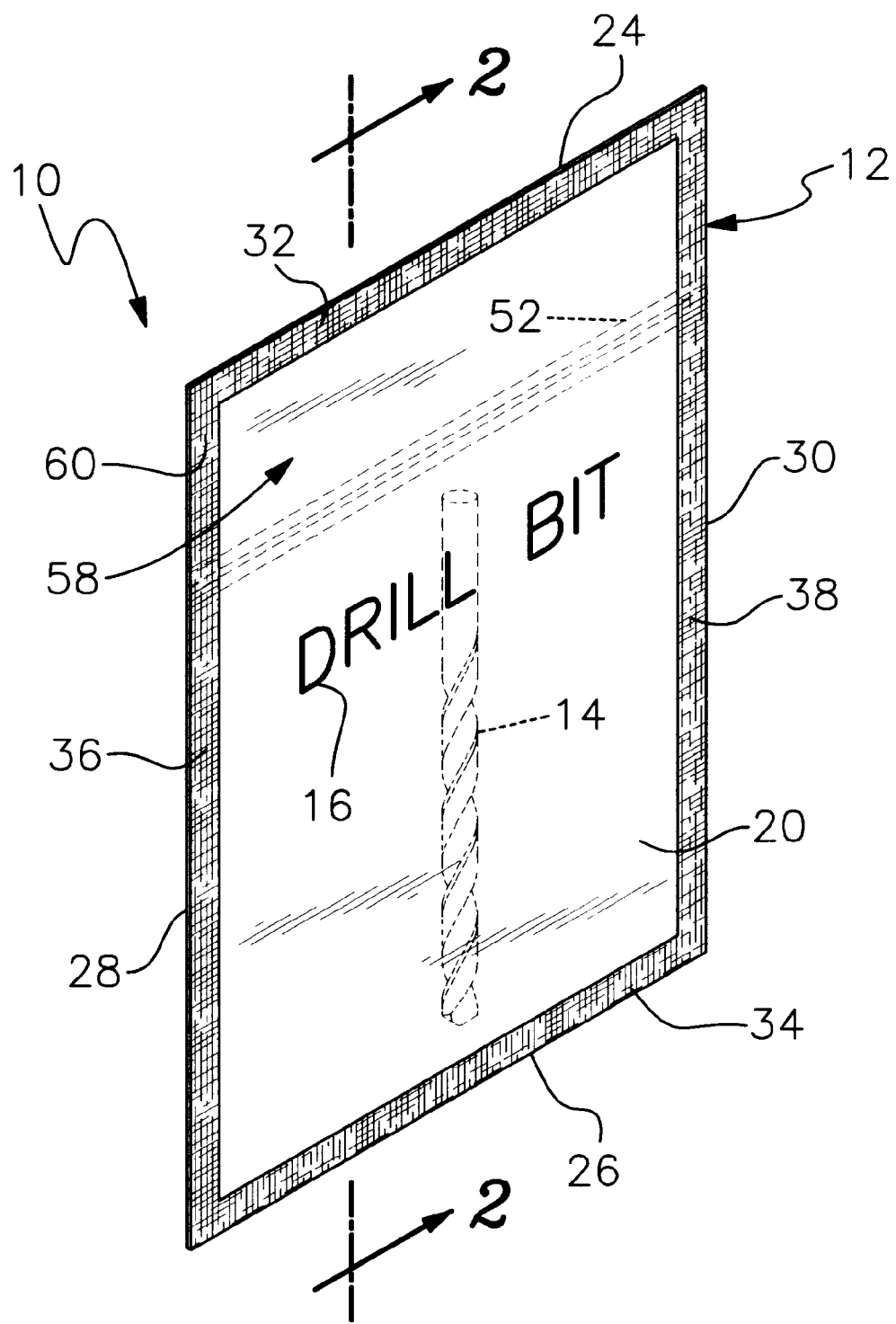
FIG. 1 illustrates a packaged product embodying the invention.
Figure 2:
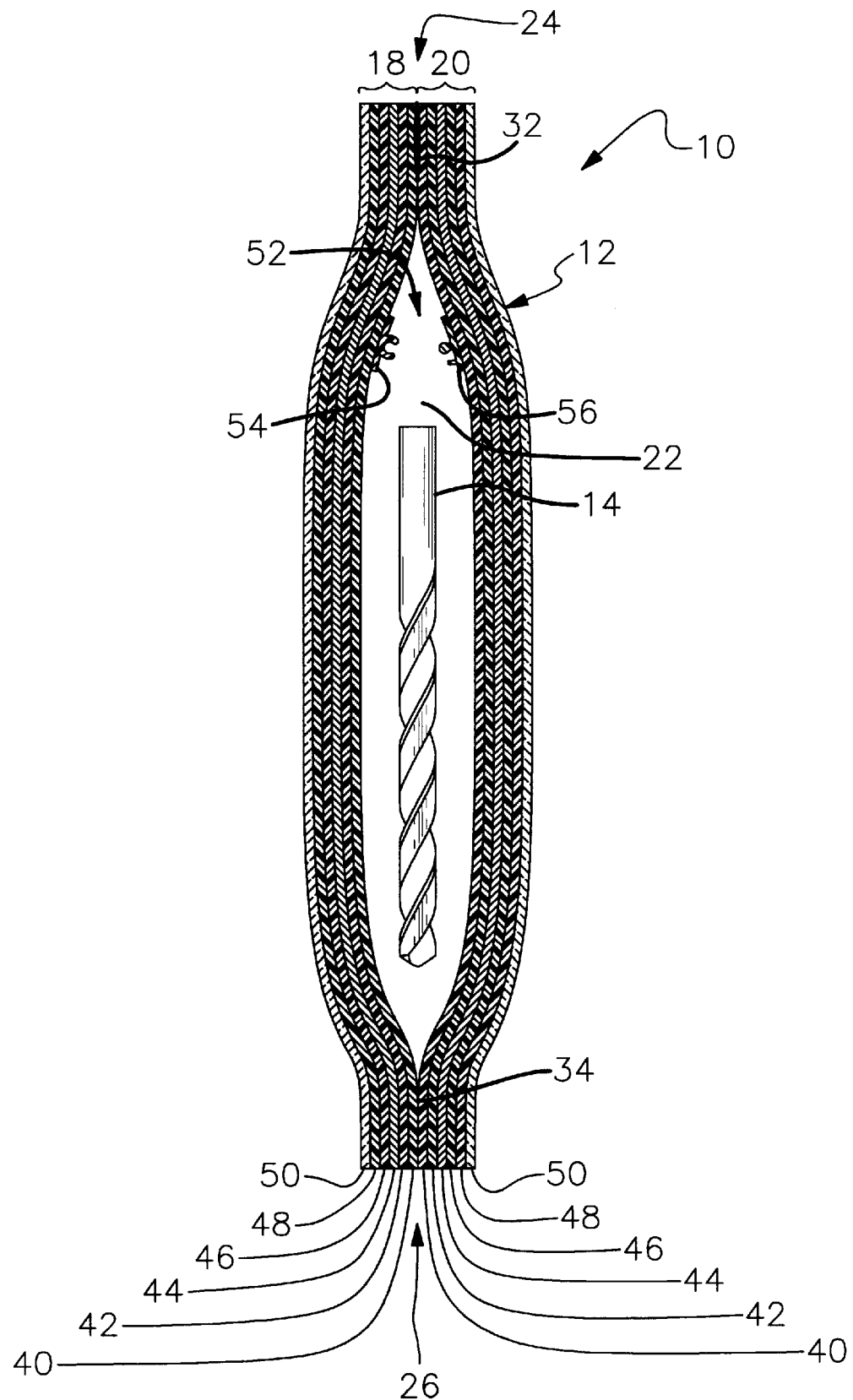
FIG. 2 is a cross-sectional view taken on line 2—2 of FIG. 1, with the thicknesses of the layers comprising the panels exaggerated for purposes of illustration.

Referring first to FIGS. 1 and 2, in an exemplary embodiment, a packaged product 10 takes the form of a zipper-type recloseable package, generally designated 12, and an oily cutting tool, in the representative form of a drill bit 14, contained within the package 12. Indicia 16 is visible on the outside of the package 12. Initially the package 12 is completely sealed for sale and prior to initial use of the drill bit 14. Following initial use, the package 12 can be employed for convenient and protected storage of the drill bit 14.

The package 12 includes a pair of panels 18 and 20 made of heat-sealable and oil-impervious material defining a product-containing area 22 between them. The panels 18 and 20 have edges 24, 26, 28 and 30 respectively defining package top, bottom and left and right sides. The panels 18 and 20 are permanently sealed to each other in heat seal regions 32, 34, 36 and 38 along the respective edges 24, 26, 28 and 30.

Each of the panels 18 and 20 is a laminate of plastic and aluminum layers, with the package indicia 16 visible at an outer surface of the panel 20.

More particularly, and as shown in FIG. 2, in the exemplary embodiment each of the panels 18 and 20 is a six-layer laminate. More particularly, starting from the inside, there is an inner polyester layer 40 of 48 g polyester, a white polyethylene layer 42 of 12# white polyethylene, an aluminum foil layer 44 of 0.000285 inch thickness aluminum foil, a polyethylene layer 46 of 12# polyethylene, a linear low density polyethylene layer 48 of 1.5 mil linear low density polyethylene printed with ink comprising the indicia 16, and an outer transparent polyester layer 50 of 48 g polyester which buries the ink comprising the indicia 16, rendering the indicia 16 visible yet resistant to being worn away. In FIG. 2, the top and bottom heat seal regions 32 and 34 are formed between facing portions of the inner polyester layers 40 of the two panels 18 and 20.

To allow the package 12 to be used for storage after it has been initially opened, there is a zipper-like recloseable strip, generally designated 52, which more particularly may be described as an interlocking bead structure 52 which effects an openable and recloseable seal between the panels 18 and 20. The interlocking bead structure 52 extends across the panels 18 and 20 generally from one 28 of the side-defining edges to the other 30. As can be seen in FIG. 2, the interlocking bead structure 52 includes a pair of plastic elements 54 and 56, extruded in appropriate profiles, and thermally bonded to the facing portions of the inner polyester layers 40 of the two panels 18 and 20.

The interlocking bead structure 52 is spaced a distance from the top-defining edge 24 so as to define a tear zone portion 58 of the panels 18 and 20 between the top-defining edge 24 and the interlocking bead structure 52. To facilitate opening the package 12, a tear notch 60 is cut into the left side edge immediately adjacent the tear zone portion 58.

Figure 3:
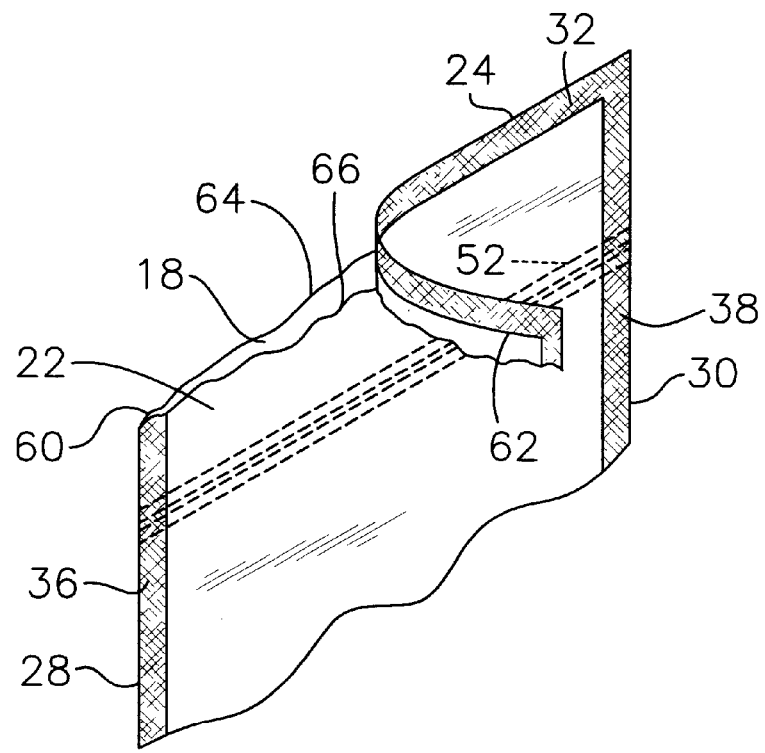
FIG. 3 is a partial view of the package of FIG. 1, depicting the manner in which the package is torn open to access the oil-coated cutting tool within.

Thus, FIG. 3 illustrates the package 12 being opened as a strip 62 is torn away, starting at the tear notch 60.

Figure 4:
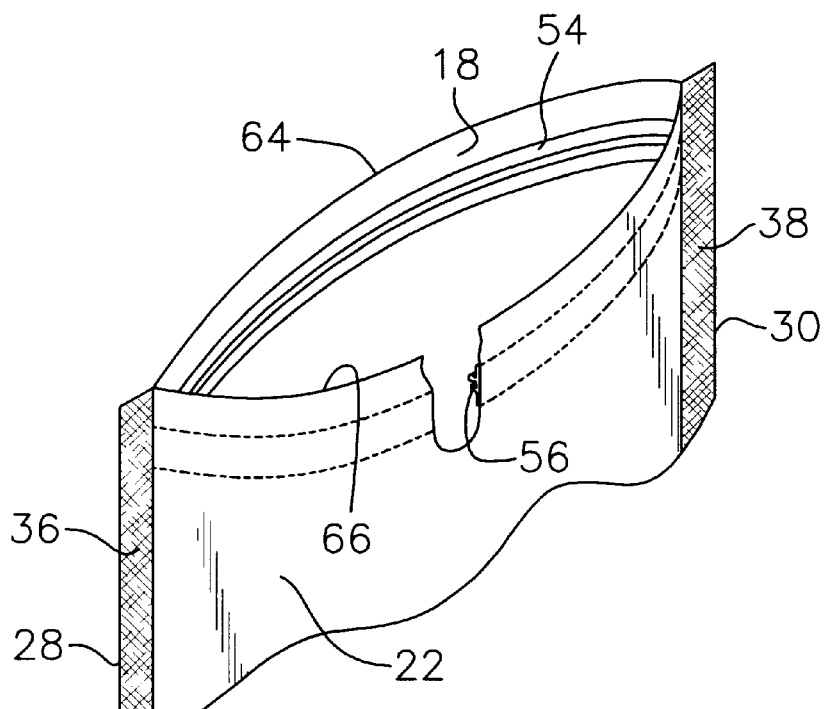
FIG. 4 depicts the completion of the opening step of FIG. 3.

FIG. 4 illustrates the result, after the tear-away strip 62 is removed, forming new top edges 64 and 66. At this point, the interlocking bead structure 52 is employed to provide an openable and recloseable seal between the panels 18 and 20, thus providing utility for the package 12 after it is initially opened.

Figure 5:
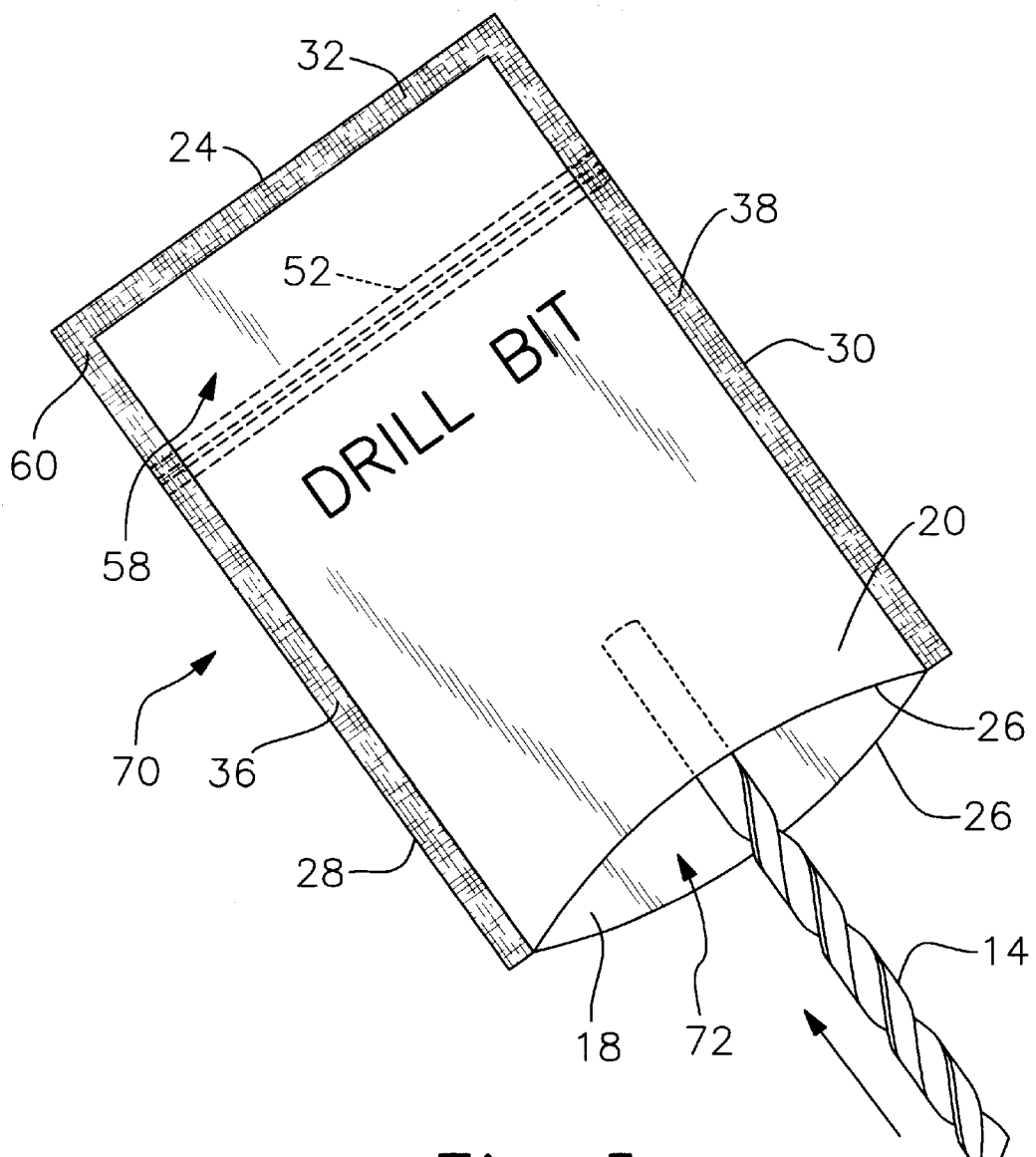
FIG. 5 depicts a step in a method for embodying the invention for packaging an oil-coated cutting tool, in particular the step of inserting the oil-coated cutting tool through the opening into the product-containing area.
Figure 6:
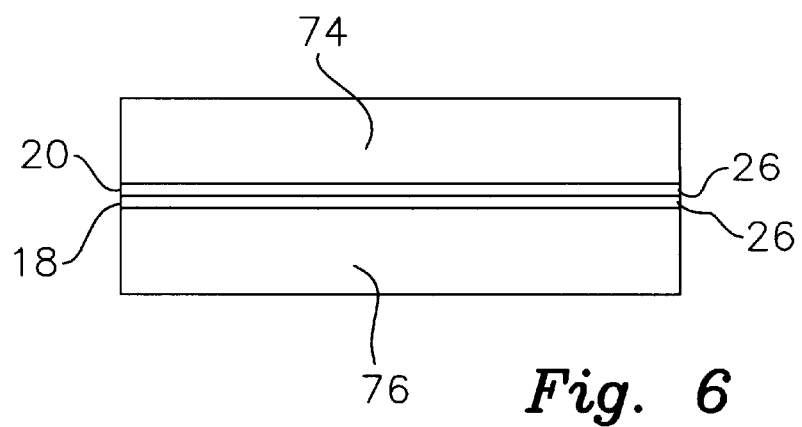
FIG. 6 depicts a subsequent heat-sealing step.

FIGS. 5 and 6 represent an exemplary embodiment of a method for packaging an oil-coated cutting tool, represented by the drill bit 14. In FIGS. 5 and 6, identical reference numerals are employed to designate corresponding elements in the embodiment of FIGS. 1–4.

In FIG. 5, a package blank 70 is provided. The package blank 70 includes the pair of panels 18 and 20 of heat-sealable and oil-impervious material defining the product-containing area 22 between them. The edges 24, 26, 28 and 30 respectively define package top, bottom and left and right sides. The panels 18 and 20 are permanently sealed together in heat seal regions 36 and 38 along the side-defining edges 28 and 30, and in heat seal region 32 along the top-defining edges 24. However, unlike the packaged product embodiment of FIGS. 1 and 2, in the embodiment of FIG. 5 there is an opening 72 along the bottom-defining edges 26, allowing access to the product containing area 22.

As in the embodiment of FIGS. 1 and 2, the package blank 70 includes the interlocking bead structure 52 which effects an openable and recloseable seal between the panels 18 and 20, generally from one 28 of the side-defining edges to the other 30, and the interlocking bead structure 52 is spaced a distance from the top-defining edges 24 to define the tear zone portion 58 of the panels 18 and 20 between the top-defining edges 24 and the interlocking bead structure 52.

To continue the packaging method, the oil-coated cutting tool 14 is inserted through the opening 72 into the product-containing area 22.

Finally, as is depicted in FIG. 6, the panels 18 and 20 are sealed to each other along the bottom-defining edges 26 by being pressed between heat seal dies 74 and 76 to form the heat seal region 34 adjacent the bottom edges 26.

While specific embodiments of the invention have been illustrated and described herein, it is realized that numerous modifications and changes will occur to those skilled in the art. It is therefore to be understood that the appended claims are intended to cover all such modifications and changes that fall within the true spirit and scope of the invention.

What is claimed is:

1. A method for packaging an oil-coated cutting tool, comprising:

providing a package blank including
a pair of panels of heat-sealable and oil-impervious material defining a product-containing area between them, and having edges defining a package top, bottom and opposite sides,
the panels being permanently sealed to each other along the side-defining and top-defining edges, with an opening along the bottom-defining edges, and
an interlocking bead structure which effects an openable and recloseable seal between the panels, the interlocking bead structure extending across the panels generally from one of the side-defining edges to the other, and spaced a distance from the top-defining edges to define a tear zone portion of the panels between the top-defining edges and the interlocking bead structure;

inserting the oil-coated cutting tool through the opening into the product-containing area; and permanently sealing the panels to each other along the bottom-defining edges so as to close the opening.

2. The method of claim 1, wherein said step of providing a package blank comprises providing each of the first and second panels as a laminate of plastic and aluminum layers, with package indicia visible at an outer surface of at least one of the panels.

3. The method of claim 2, wherein said step of providing a package blank comprises providing each of the first and second panels as a laminate including, starting from an inside surface, an inner polyester layer, a white polyethylene layer, an aluminum foil layer, a polyethylene layer, a linear low density polyethylene layer printed with ink, and an outer transparent polyester layer.

4. A packaged product comprising:

a pair of panels of heat-sealable and oil-impervious material defining a product-containing area between them, and having edges defining package top, bottom and opposite sides;

said panels being permanently sealed to each other along said edges;

an interlocking bead structure which effects an openable and recloseable seal between said panels, said interlocking bead structure extending across said panels generally from one of said side-defining edges to the other, and spaced a distance from said top-defining edges to define a tear zone portion of said panels between said top-defining edges and said interlocking bead structure; and an oil-coated cutting tool contained within the product-containing area.

5. The packaged product of claim 4, wherein said panels each comprise a laminate of plastic and aluminum layers, with package indicia visible at an outer surface of at least one of said panels.

6. The packaged product of claim 5, wherein said panels each comprise a laminate including, starting from an inside surface, an inner polyester layer, a white polyethylene layer, an aluminum foil layer, a polyethylene layer, a linear low density polyethylene layer printed with ink, and an outer transparent polyester layer.

* * * * *